B. L. AND E. B. GIFFORD.
ASSORTING MACHINE.
APPLICATION FILED FEB. 17, 1919.
1,397,955.
Patented Nov. 22, 1921.
5 SHEETS—SHEET 2.
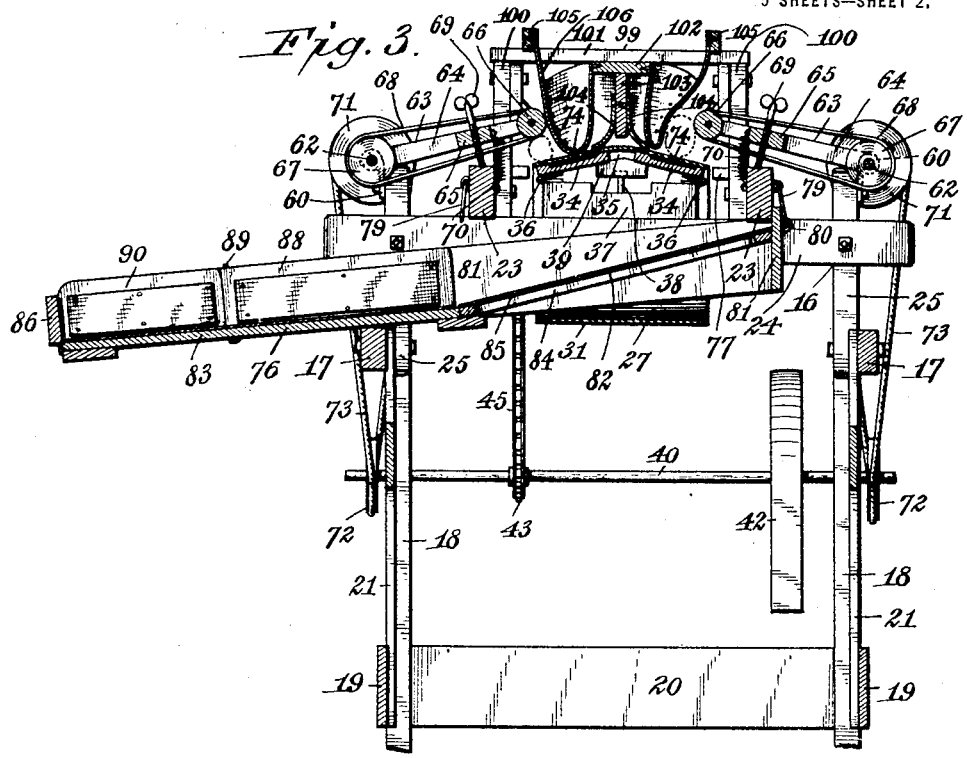
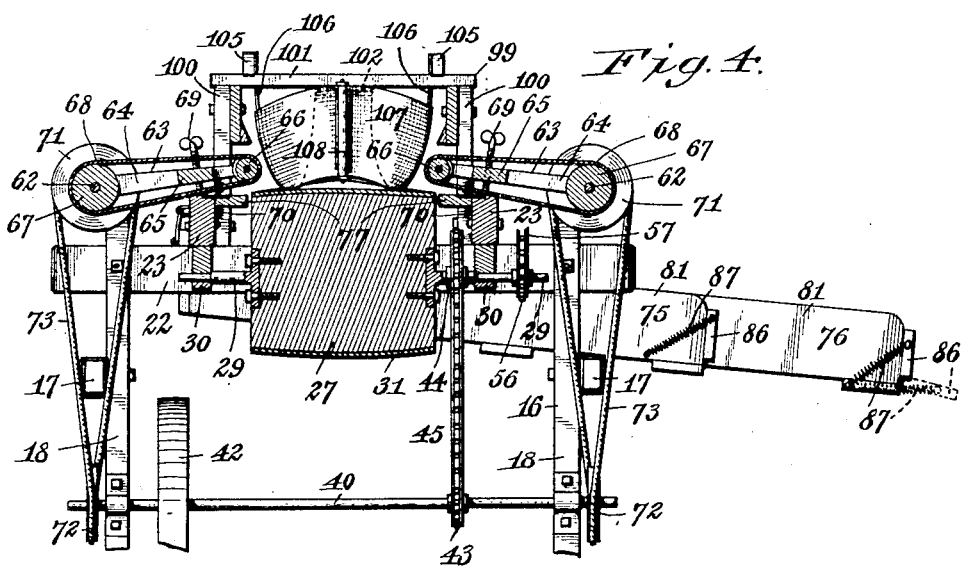
Witness:
Jacob Obrist, Jr.
Bert L. Gifford  } Inventors.
Edgar B. Gifford }
By Emil Neuhart
Attorney.

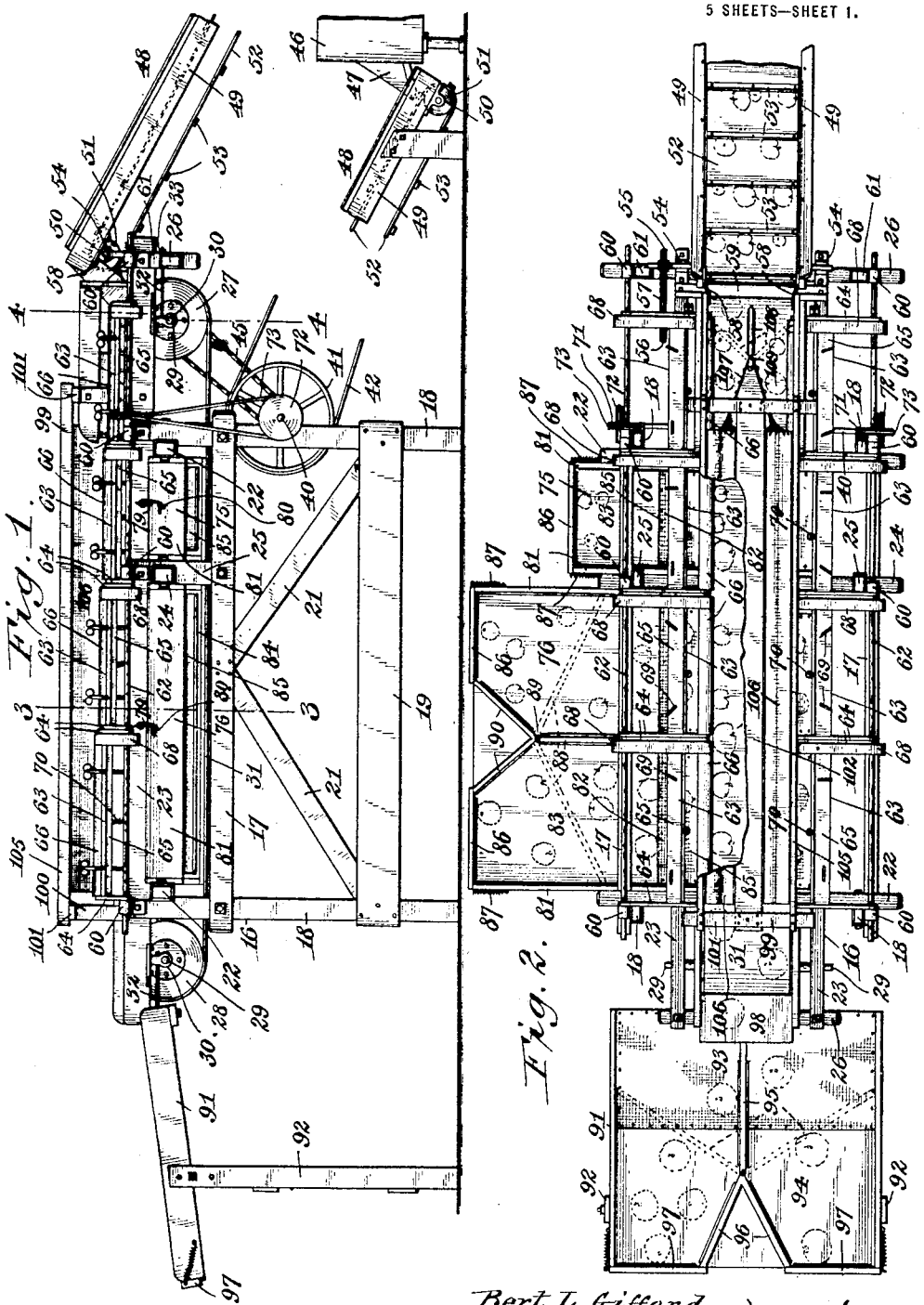

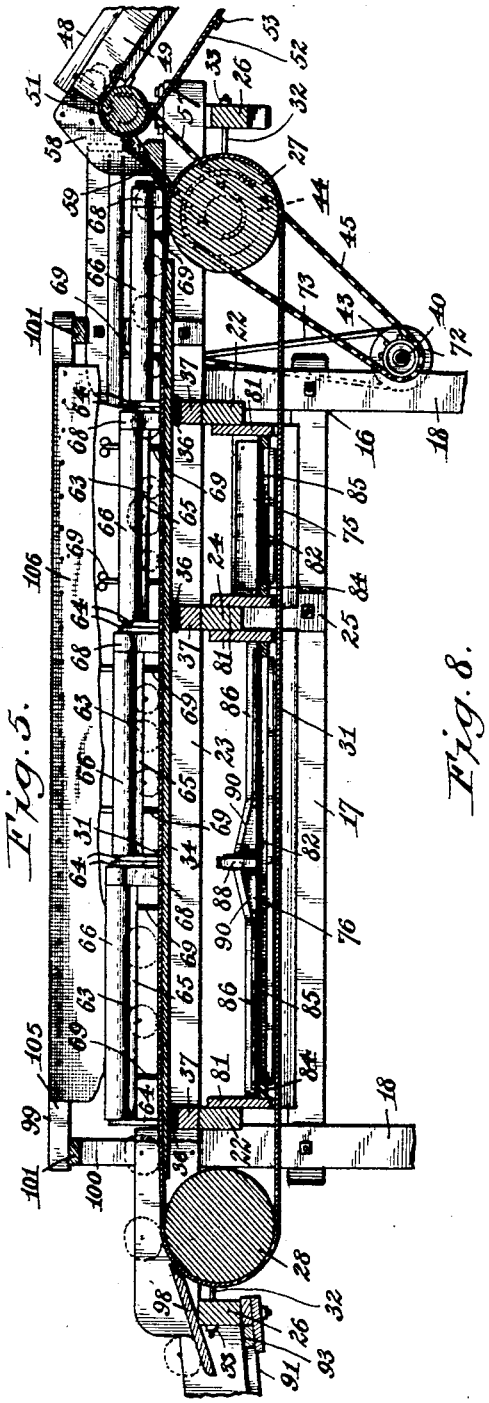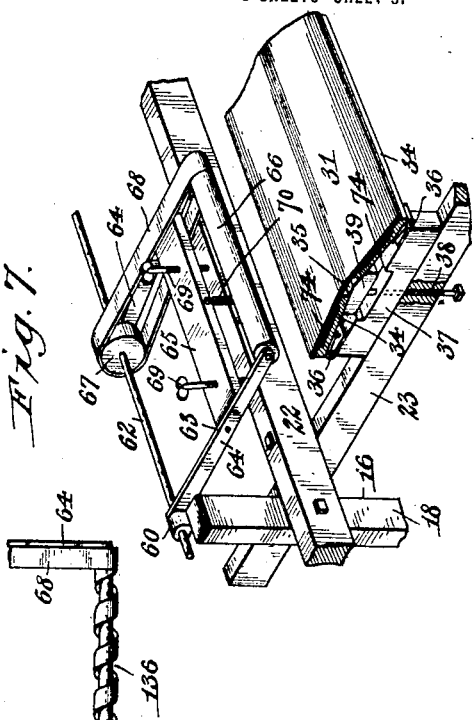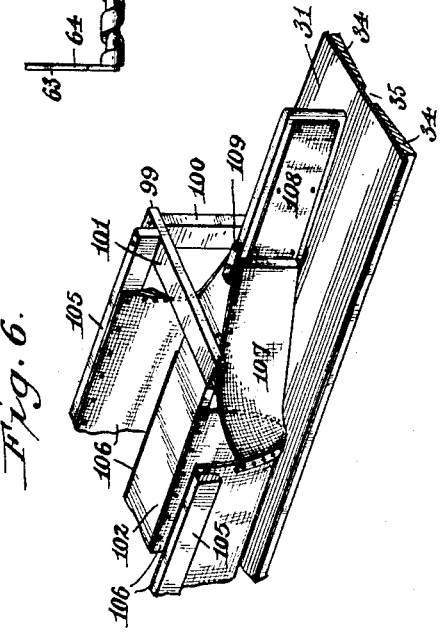

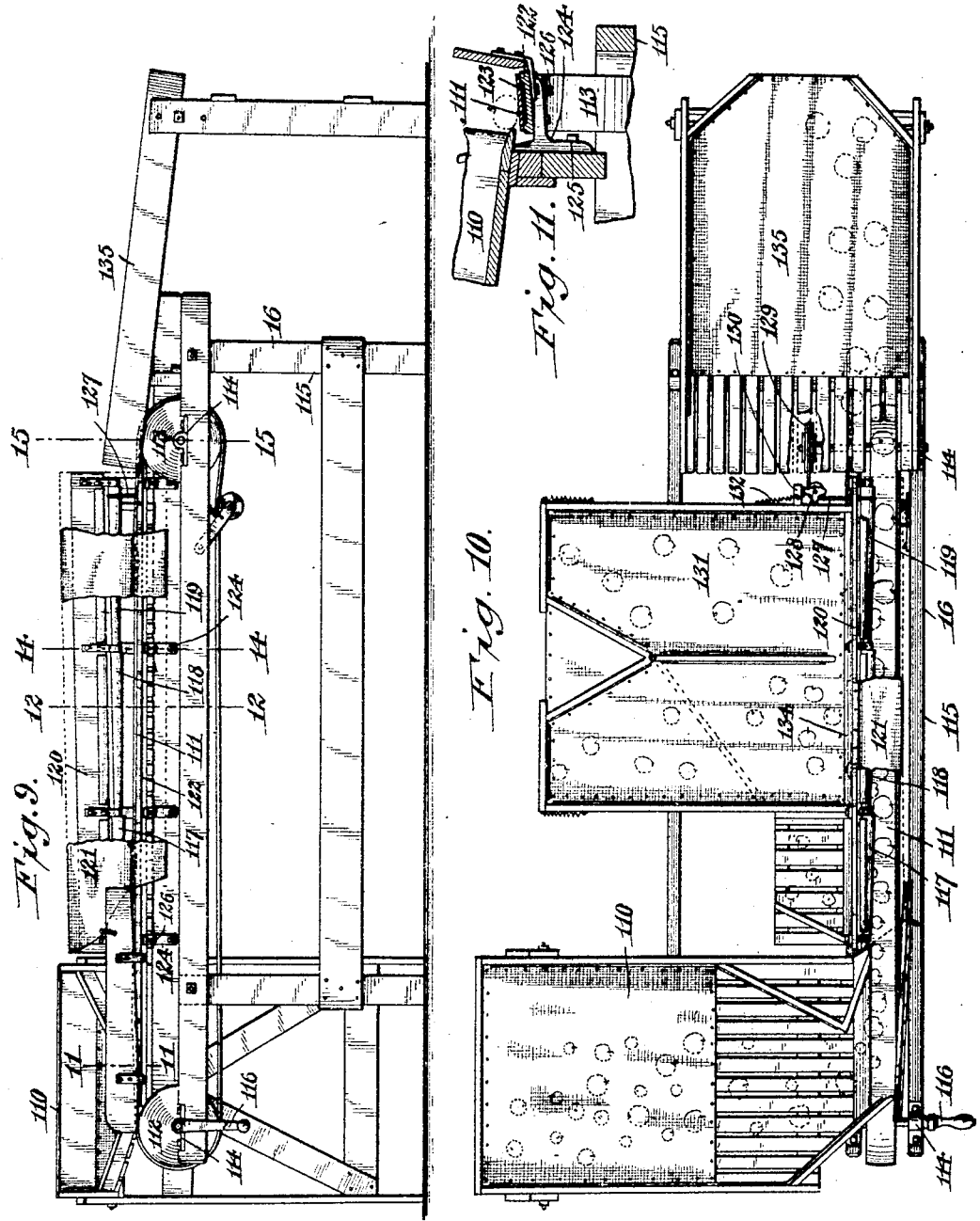

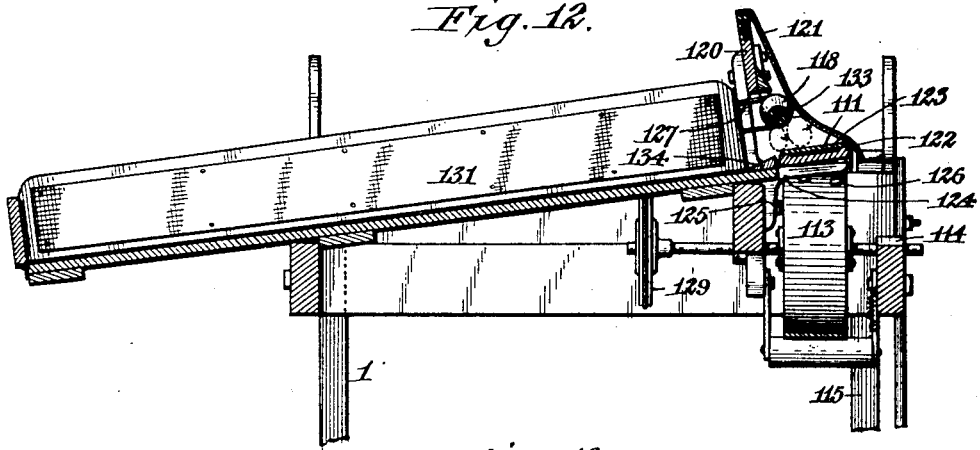
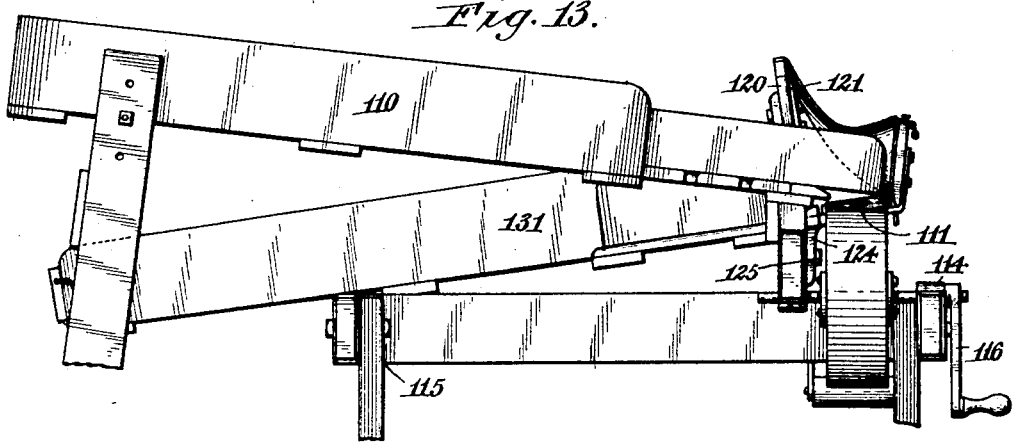
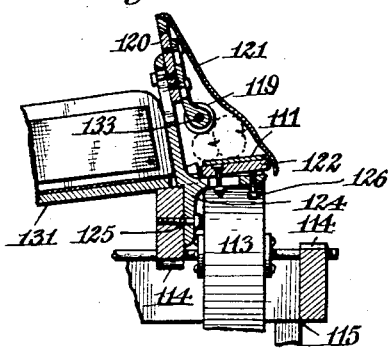
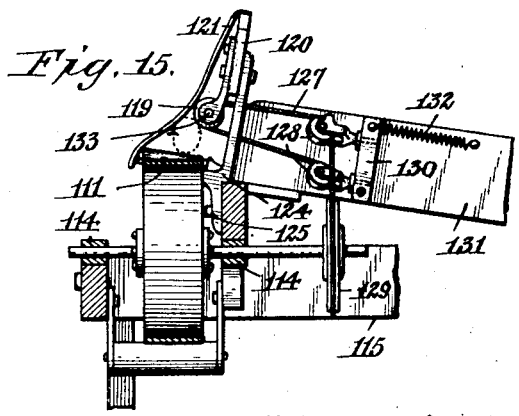

UNITED STATES PATENT OFFICE.

BERT L. GIFFORD AND EDGAR B. GIFFORD, OF BARKER, NEW YORK, ASSIGNORS, BY MESNE ASSIGNMENTS, TO THE REX COMPANY, OF ROCHESTER, NEW YORK, A CORPORATION OF NEBRASKA.

ASSORTING-MACHINE.

1,397,955.  Specification of Letters Patent.  Patented Nov. 22, 1921.

Application filed February 17, 1919. Serial No. 277,606.

*To all whom it may concern:*

Be it known that we, BERT L. GIFFORD and EDGAR B. GIFFORD, citizens of the United States, residing at Barker, in the county of Niagara and State of New York, have invented certain new and useful Improvements in Assorting-Machines, of which the following is a specification.

Our invention relates to improvements in assorting machines, such as are adapted to assort fruit and other produce into lots of different sizes.

One of the primary objects of our invention is the production of what may be termed a double capacity machine, in which provision is made for delivering the assorted or graded fruit or other produce to one side of the machine so as to eliminate the use of a double force of employees, as now required in double capacity machines in which the fruit or other produce is delivered to opposite sides of the machine.

Another object of our invention is the provision of a machine which is simple in construction and thoroughly effective in grading apples, peaches, and other fruits, as well as vegetables, and in which provision is made for quickly and conveniently adjusting the machine to the various sizes of the produce to be assorted.

Another object is the production of a machine of this kind having novel means for adjusting the forwarding surface of the runway so that fruit or small vegetables of different shapes will be delivered to the grading devices with facility.

Other objects of our invention are, the provision of means within the machine which will serve to automatically position apples passing through the machine so that the stems and blows thereof are in a horizontal, or substantially horizontal, plane and so that the apples may be graded in accordance with their diameter taken at right angles to a plane passing through the stem and blow of each.

With these and other objects to appear hereinafter, the invention consists in the novel feature of construction, and in the arrangement and combination of parts to be hereinafter described and more particularly pointed out in the subjoined claims.

In the drawings:

Figure 1 is a side elevation of a machine constructed in accordance with our invention, a portion of the inclined feeding or elevating leg being broken away.

Fig. 2 is a plan view of the same.

Fig. 3 is an enlarged transverse section taken on line 3—3, Fig. 1.

Fig. 4 is an enlarged transverse section taken on line 4—4, Fig. 1.

Fig. 5 is an enlarged horizontal section taken to one side of the longitudinal center of the machine.

Fig. 6 is a perspective view of a portion of the endless feeding belt or carrier and the means for guiding the fruit or other produce to the grading spaces of the machine.

Fig. 7 is a perspective view of a portion of a machine showing one of the adjustable grading rollers, the supporting frames therefor, the means for driving said roller, and the endless feeding belt or carrier.

Fig. 8 is a plan view of a modified form of grading roller, one particularly designed for grading potatoes.

Fig. 9 is a side elevation of a modified form of our invention, showing what may be termed a single assorting machine.

Fig. 10 is a plan view of the same.

Fig. 11 is an enlarged fragmentary transverse section taken on line 11—11, Fig. 9.

Fig. 12 is an enlarged transverse section taken on line 12—12, Fig. 9.

Fig. 13 is an enlarged end view of the upper portion of the machine viewed from the left of Fig. 9.

Fig. 14 is an enlarged fragmentary transverse section taken on line 14—14, Fig. 9.

Fig. 15 is an enlarged fragmentary transverse section taken on line 15—15, Fig. 9, looking toward the left.

Having reference now to Figs. 1 to 8 of the drawings, the reference numeral 16 designates a frame which may be constructed in any suitable manner. This frame, however, is preferably formed of a pair of longitudinally-disposed upper members 17 fastened to four uprights or standards 18 connected together at their lower ends by means of longitudinal tie-members 19 and transverse tie-members 20. The uprights or standards are braced near their lower ends to the longitudinal upper members 17 by brace members 21. Near their upper ends, opposite uprights or standards 18 are connected together by transverse supporting members 22 upon which rest a pair of spaced longitudinal supporting members 23, and an additional transverse supporting member 24 carried by short standards 25 secured to the pair of longitudinal upper members 17 also serves to support said spaced longitudinal supporting members 23. These longitudinal supporting members extend outwardly beyond the uprights or standards 18 and at each end of the machine are connected together by a transverse tie-member 26.

27, 28 designate belt pulleys or reels, each having shafts 29 secured to opposite ends thereof, said shafts being journaled in bearings 30 secured to the under sides of the longitudinal supporting members 23. Arranged around said belt pulleys or reels is an endless feeding belt or carrier 31, the outer face of which serves as a forwarding surface. These pulleys or reels are slightly crowned so as to give the belt pitch laterally in opposite directions from a point medially between the ends of each pulley or reel. In order to keep this belt taut, the bearings 30 are adjustably secured to the longitudinal supporting members 23, the adjustment being effected by adjusting bolts 32 passing through said bearings and through the transverse tie-members 26 at opposite ends of the longitudinal supporting members 23, nuts 33 being secured to said bolts and bearing against the transverse tie-members. The belt or carrier 31 travels in contact with two supporting boards 34 which are inclined laterally in opposite directions with a clearance space 35 between the inner edges of the same. These boards are hinged or otherwise pivotally secured at their outer edges, as at 36, to extensions 37 of the transverse supporting members 22, 24, and threaded through said transverse supporting members and the extensions thereof are adjusting bolts 38, the upper end of each of which is rotatably mounted or otherwise arranged in a bearing block 39 having its upper face inclined laterally in opposite directions from a point midway between its ends. On the oppositely inclined portions of each bearing block 39, the inner marginal portion of the supporting boards 34 rest. Consequently, when adjusting the bolts, these bearing blocks move upwardly or downwardly, as the case may be, causing the supporting boards to swing on their pivots so as to increase or diminish the inclination of these boards and consequently the inclination in opposite directions of the feeding belt or carrier.

40 designates a drive shaft journaled in bearings secured to the uprights or standards 18 at the feeding end of the machine. This shaft has a pulley 41 secured thereto, around which a driving belt 42 is passed which may be operated by any suitable source of power. On said driving shaft 40 a sprocket wheel 43 is secured around which and a sprocket wheel 44 secured to one of the shafts 29 of the adjacent belt pulley or reel 27, a sprocket chain 45 is passed, said chain serving to rotate said pulley or reel and cause the endless feeding belt or carrier to travel and feed the fruit or other produce through the machine to be assorted in the manner to be hereinafter described.

46 designates a portion of a bin into which the fruit or other produce to be assorted is placed. This bin is provided with a spout 47 leading to the lower end of an inclined feeding or elevating leg 48. The upper end of said leg is supported on the feeding end of the machine frame. This elevating leg comprises side members 49 to the lower edges of which bearings 50 are secured in pairs and in each pair is journaled the shaft of a reel 51 one reel being at the lower end of said leg and the other at the upper end thereof. Passing around said reels is an endless feeding belt 52 having slats or strips 53 secured to its outer surface so that when fruit or other produce is delivered onto the belt from the bin 46, it may be carried upwardly, with the slats or strips serving to retain the fruit or other produce upon said belt. As the fruit or other produce is delivered into the machine at a high point, it is apparent that this feeding or elevating leg is of great convenience, owing to the fact that the fruit or other produce to be assorted need not be lifted in the usual cumbersome manner, as the bin 46 into which the fruit is placed is at a comparatively low point and the fruit will be delivered automatically into the machine.

At the feeding end of the spaced longitudinal supporting members 23, a pair of brackets 54 are arranged, these brackets having upwardly opening notches in which the opposite ends of the shaft projecting from the upper reel 51 of the feeding or elevating leg are journaled. These brackets, in addition to serving as journals for said shaft, also serve as a means to retain the upper end of the elevating leg on the frame of the machine. Secured to said last-mentioned shaft is a sprocket wheel 55, around which and a sprocket wheel 56 secured to one of the shafts 29 of the carrier pulley or reel 27, a sprocket chain 57 is passed. Thus, the endless belt or carrier of the feeding or elevating leg 48 is driven from the shaft of the carrier pulley or reel 27 at the feeding end of the machine.

Secured to the inner faces of the side members 49 of said feeding or elevating leg at the upper or inner ends thereof, are two guard members 58 which serve to prevent the fruit or other produce delivered from said leg onto the forwarding surface of the feeding belt or carrier, and fastened to these guard members by means of a cross strip or otherwise is a flexible guide-member 59 which may be a piece of canvas or other like material having its upper end in close proximity to the endless belt or carrier of the feeding or elevating leg and its lower end resting loosely in contact with the forwarding surface of the feeding belt or carrier so that fruit or other produce leaving the feeding or elevating leg will be assured of proper delivery onto the forwarding surface of said feeding belt or carrier.

Arranged at opposite sides of the machine are two sets of alined bearings 60 which are secured to the upper ends of the uprights or standards 18, to the upper ends of the short standards 25, and to short standards 61 rising from the transverse tie-member 26 at the feeding end of the machine. In each set of these bearings a shaft 62 is journaled on which is pivotally mounted a plurality of grading frames 63. In the drawings I have shown two sets of grading frames at opposite sides of the longitudinal center of the machine, each set consisting of four frames, but it is apparent that the number of grading frames to a set may be varied, depending on the number of lots into which the fruit or other produce is to be graded. Each grading frame comprises two side bars 64 supported at their outer ends by one of the shafts 62 and in which said shaft rotates. Between their ends these side members are connected by a longitudinal tie-member 65, and journaled in the inner ends of the side bars 64 of each grading frame is a grading roller 66. The grading frames of each set are arranged side by side, and secured to each shaft adjacent one of the side members of each grading frame is a belt pulley 67, around which and the grading roller of the same frame, a driving belt 68 is passed. The longitudinal tie-members 65 of the grading frames at each side of the machine are positioned directly over the longitudinal supporting member 23 at the same side of the machine, and threaded through each of said tie-members 65 from the top are one or more adjusting bolts 69, the lower ends of which bear against the upper face of said longitudinal supporting member and serve to adjust the grading rollers with respect to the forwarding surface of the feeding belt or carrier. Consequently, by means of said adjusting bolts 69, the distance between the grading roller of the several grading frames and the forwarding surface of the feeding belt or carrier may be varied, the distances being enlarged from the feeding end of the machine to the delivery end thereof, as clearly shown in Fig. 5.

It is apparent that when adjusting the grading frames, they swing upwardly or downwardly according to the adjustment made, with the shafts 62 as their centers, and in order to retain the grading rollers of each frame in adjusted position, a retractile spring 70 is provided for each frame, opposite ends of each spring being secured to a longitudinal tie-member of the grading frame and the longitudinal supporting member 23 directly beneath.

Each of the shafts 62 has a pulley 71 secured thereto, and at each end of the drive shaft 40 is a pulley 72 arranged at a right angle to the pulleys 71. Passing around the pulleys 71 and 72 at each side of the frame is a driving belt 73. The grading rollers are therefore rotated from the drive shaft 40, through the medium of the pulleys 72, belt 73, pulleys 71, shafts 62, pulleys 67 and belts 68.

It is to be noted that the supporting boards 39 have longitudinal depressions 74 on their upper sides. Said depressions extend from end to end of each of said boards and are covered by the feeding belt or carrier 31. This feeding belt or carrier is preferably made of canvas or other flexible material, and when the fruit is carried along by said belt or carrier and travels in contact with the grading rollers, the fruit is directly over the depressions in said supporting boards, and it is further to be noted that each of the grading rollers has its inner half traveling upwardly so as to prevent the fruit being forced laterally through the grading space between the roller and the feeding belt or carrier. By thus rotating the grading rollers, the fruit will not pass underneath the same until a grading space has been reached, which will admit its free passage therethrough. This will prevent crushing of the fruit or other produce. Furthermore, when the fruit or other produce passes through said grading space, it cannot be bruised or squashed even though a hump or enlarged portion of the fruit is encountered, since the belt or carrier will yield by entering the depression 74 in the supporting board which it covers, with the result that a pocket will be formed in the belt or carrier to receive the fruit and the fruit will be automatically thrown out of contact with the grading roller before pinching or bruising of the fruit can take place. As a further guard against injury to the fruit or other produce, the mounting of the grading frames is such that they are permitted to swing upwardly, although restrained by the retractile springs 70, and this causes momentary enlargement of the grading space so as to allow the passage of the fruit or other produce therethrough. Moreover, by inclining the feeding belt or carrier, as shown, and causing the grading rollers to rotate so that their inner halves move upwardly, the fruit moving forward with the belt or carrier is caused to assume a certain position so that all fruit is graded according to size, considered on a certain basis; for example, when grading apples, the apples are positioned with their stems and blows at right angles to the forwarding surface of the feeding belt or carrier, or substantially so.

Throughout the greater portion of the length of the machine, the opposite edges of the feeding belt or carrier are spaced from the longitudinal supporting members 23 so that fruit or other produce passing underneath the grading rollers is free to drop through said spaces and be delivered onto receiving racks or tables 75, 76, one of which is a single rack or table and the other a double rack or table, as shown in Fig. 2 of the drawings.

In the particular representation of my invention illustrated, I have shown four pairs of grading rollers, the rollers of each pair being at opposite sides of the machine. The double receiving rack or table 76 is adapted to receive the fruit or other produce from two pairs of grading rollers, while the single receiving rack or table 75 is adapted to receive the fruit or other produce from one pair of grading rollers, and as shown in the drawings the first pair of grading rollers at the receiving end of the machine is adapted to cause fruit to be delivered to opposite sides of the machine, no receiving rack or table being provided for the same, although one may be used for this pair of grading rollers, if desired. Underneath each roller of the first pair of grading rollers, a guide board 77 is arranged which extends inwardly from the adjacent longitudinal supporting member 23 to within close proximity of the adjacent edge of the feeding belt or carrier. These guide boards may be hinged or otherwise secured to said longitudinal supporting members and they serve to close the space between the latter and the edges of said feeding belt or carrier; thus fruit or other produce passing underneath the first pair of grading rollers is guided outwardly over the longitudinal supporting members 23 and may fall into any suitable receptacle placed beneath to receive the same.

The second pair of grading rollers is adapted to deliver the fruit or other produce to the single receiving rack or table 75, while the two remaining pairs of grading rollers deliver the fruit or other produce to the double receiving rack or table 76. Each of these receiving racks or tables receives support from one of the longitudinal upper members 17 and the inner end thereof bears against the under side of the longitudinal supporting member 23 at the opposite side of the machine. In order to retain the racks or tables in position, a swinging catch 79 or other suitable fastening device is secured to the outer side of each of said longitudinal supporting members 23, and one of these catches is adapted to be connected to a coöperating part or eye 80 secured to the rack or table. The receiving rack or table is therefore readily removable and may be reversed so that instead of feeding to the side of the machine shown in the drawings, it will feed to the opposite side of the machine, in which case the other swinging catch 79 will be made to co-act with the coöperating part or eye 80 on the rack.

Each of the receiving racks or tables is of a substantially rectangular formation and has side and end walls 81, a removable bottom or table portion 82 at its inner end, and a fixed bottom or table portion 83 at its outer end. The removable bottom or table portion of each rack or table comprises a rectangular frame 84 over which canvas 85 or any other textile or flexible material is stretched so as to provide a soft and yielding surface onto which the fruit or other produce is dropped from the feeding belt or carrier. Each of the racks or tables 75, 76 is inclined, as shown in Fig. 3, so that the fruit or other produce will roll outwardly toward the outer end of the rack or table, where it will be retained by a movable wall or walls 86, preferably in the form of gates hinged to the outer end of the fixed bottom portion 83 and retained in upright position by springs 87. The double receiving rack or table 76 is divided into two parts by a movable dividing wall 88, hinged as at 89, so that it may be swung laterally in either direction, as indicated by dotted lines in Fig. 2. From the outer or hinged end of said dividing wall, two short diverging walls 90 are provided which terminate in line with the outer edge of the rack or table, and between the outer ends of said diverging walls and the outer ends of the side walls 81 the gates 86 are arranged. The double rack or table 76 therefore has two gates, and when the dividing wall 88 is arranged centrally between or parallel with the side walls 81 of the rack or table, the fruit or other produce from the last two pairs of grading rollers will be delivered in two separate lots. When swinging the dividing wall 88 either to the right or the left, as shown in dotted lines in Fig. 2, the fruit or other produce passing under the last two pairs of grading rollers will be delivered from the double receiving rack or table as a single lot.

At the end of the machine opposite the receiving end, provision is made for delivering the largest size of fruit or other produce passing through the machine, and for this purpose a receiving rack or table 91 is provided having supporting legs 92 near its outer end and it is secured at its inner end to the adjacent transverse tie-member 26. This rack 91 is constructed similar to the racks 75, 76, it having a removable inner bottom portion 93 and a fixed outer bottom portion 94. Like the double rack 76 it is provided with a pivoted dividing wall 95 adapted to be swung laterally in either direction, as indicated by dotted lines in Fig. 2, and from the pivotal point of this divisional wall two short diverging walls 96 are provided which extend outwardly to the outer edge of the rack or table. Two gates 97 are provided so that the fruit or other produce may be delivered into two separate receptacles placed beneath the outer end of the rack or into a single receptacle, depending upon the position of the dividing wall 95.

The machine illustrated is therefore arranged to assort fruit or other produce into five different grades or sizes, the first pair of grading rollers at the receiving end of the machine being adjusted to grade the smallest size, or what is generally known as "culls", and this size is delivered over the side of the machine into suitable receptacles provided for the purpose. The second pair of grading rollers are adapted to assort the next larger size from the fruit or other produce passing through the machine and deliver the same onto the receiving rack or table 75. The third pair of grading rollers are adapted to deliver the next larger size of fruit or other produce onto the first half of the double receiving rack or table 76, while the last pair of grading rollers are adjusted to deliver the next larger size onto the second half of said double rack or table.

All fruit or other produce carried through the machine by the feeding belt or carrier 31 which are not assorted laterally by the grading rollers, are carried to the tail or rear end of the machine and delivered onto the feeding rack or table 91. For this purpose a guide board 98 is provided, which has its inner edge in close proximity to the feeding belt or carrier, while its outer portion overhangs the transverse tie-member 26 so as to deliver the fruit or other produce onto the flexible bottom 93 of the rack 91, from which it will roll onto the lower portion of the rack or table and be delivered from the outer end thereof through one or both of the gate openings, depending on the position of the dividing wall 95.

With a view of keeping the fruit or other produce in contact with the grading rollers while passing through the machine, I have provided a super-frame 99 comprising uprights 100 secured to and extending upwardly from the longitudinal supporting members 23. The upper ends of these uprights are connected together by transverse tie-members 101, to the under side of which a longitudinally-disposed board 102 is secured. This board 102 has a dividing wall 103 secured to the under side thereof, to opposite sides of which flexible strips 104 are secured, which bear at their lower ends against the forwarding surfaces of the feeding belt or carrier. Two longitudinal members 105 are secured to the upper sides of the transverse tie-members 101 at opposite sides of the longitudinal center of the machine.

106 represents two canvas or other flexible guide members which are in sheet form with opposite longitudinal marginal portions secured to the longitudinal members 105 and to opposite edges of the board 102, the canvas or other material being folded or allowed to sag so that it touches the forwarding surface of the feeding belt or carrier, as clearly shown in Fig. 3. These flexible guide members tend to urge the fruit or other produce passing through the machine against the batteries of grading rollers arranged at opposite sides of the machine so that when the fruit or other produce reaches a roller, adjusted to provide a space underneath the same which will allow the fruit or other produce to pass, the roller rotating and acting against the fruit, as hereinbefore described, will assure proper delivery of the fruit onto the proper receiving rack or table.

In the event of the flexible guide members 106 becoming accidentally elevated from the forwarding surface of the feeding belt or carrier so that the fruit may pass underneath the same, the flexible strips 104 will serve to prevent the fruit coming in contact with the dividing wall 103 and thus becoming bruised. The outer folds of each of the flexible guide members 106 have a V-shaped flexible guide strip 107 secured thereto at their front ends, the point of which is arranged centrally over the belt or carrier, as clearly shown in Fig. 6, and extending forwardly from this V-shaped guide strip is a gate 108 hinged at its rear end adjacent the point of said V-shaped guide strip, as at 109, and adapted to be retained in longitudinal position or be swung laterally into inclined position to either side of the machine, as indicated by dotted lines in Fig. 2.

When said gate 108 is swung to one side of the machine, the fruit delivered onto the feeding belt or carrier will be directed toward the grading rollers at one side of the machine so that the capacity of the machine may be reduced in accordance with the number of attendants available or in accordance with the amount of fruit to be assorted.

While we have shown four pairs of grading rollers, it is apparent that this number may be changed and that either a smaller or a larger number may be employed without departing from the principle of our invention herein involved or sacrificing any of the advantages thereof.

In Figs. 9 to 15 we have shown a modification of our invention, in which the machine illustrated is what may be termed a single machine; that is, for grading at one side only. In this modification we have substituted for the feeding or elevating leg, a delivery rack or table 110, the delivery end of which feeds the fruit or other produce onto the feeding belt or carrier 111, which belt or carrier travels around the two spaced pulleys 112, 113 journaled in bearings 114 on the frame 115 of the machine. The delivery rack or table 110 is arranged to feed the fruit into the machine from the side thereof and is located at what may be termed the front end of the machine.

Secured to the shaft of the pulley or reel 112 at the front end of the machine is a crank 116 by means of which the belt or carrier 111 may be caused to travel rearwardly so as to carry the fruit or other produce through the machine. In this modification we have shown three grading rollers 117, 118, 119, which are adjustable in any suitable manner to vary the space between each and the feeding belt or carrier, with a view of gradually enlarging the grading spaces toward the rear end of the machine. These grading rollers are journaled in bearings secured to an upright or grading board 120, to the upper edge of which an apron 121 of canvas or other flexible material is secured, said apron being partly broken away in Figs. 9 and 10. This apron hangs from the upright or grading board 120 in the manner shown in Figs. 12, 14, 15, and tends to crowd the fruit or other produce against the grading roller, as clearly indicated in these figures, and it is to be noted that the feeding belt or carrier 111 is inclined toward the grading rollers. The feeding belt or carrier 111 travels in contact with the upper side of a supporting board 122, which has a depression 123 in its upper face similar to the depressions 74 formed in the supporting boards of our preferred construction, illustrated in Figs. 1 to 8. This supporting board 122 is secured to brackets 124 fastened to the frame 115, as at 125, and through said brackets, adjusting bolts 126 are threaded which bear against the under side of said supporting board so that by threading the bolts more or less through the brackets, the supporting board will be inclined accordingly and consequently the feeding belt or carrier passing in contact with the same be given the desired inclination to feed the fruit or other produce laterally toward the grading rollers. In this instance the grading rollers are rotated by means of a belt 127 which passes around the rearmost grading roller at its rear end, over tightening pulleys 128 and around a pulley 129 secured to the shaft of the pulley 113 at the rear end of the machine. The tightening pulleys 128 are secured to a pivoted block 130 fastened to one of the side walls of a receiving rack or table 131, a retractile spring 132 being fastened at one end to said pivoted block and at its other end to said wall and tending to draw said tightening pulleys 128 laterally away from the grading roller around which said belt is passed. The grading rollers are secured to a single shaft 133 extending from end to end of the upright or grading board 120 so that they all rotate in unison.

It will be noted that the receiving rack or table 131 rests upon the frame 115 and at its inner end it is provided with a tapered guide strip 134, the highest point of which is level with the feeding belt or carrier, or substantially so. In this case the fruit passing through the grading space between the belt or carrier and the grading rollers rolls directly into the receiving rack or table and from the latter may be delivered into proper receptacles by lowering the gates of said rack. At the rear end of the machine a receiving rack 135 is provided onto which is delivered the larger size of fruit to be graded, or of fruit larger than the grading space between the rearmost grading roll and the feeding belt or carrier.

In Fig. 8 we have shown a modified form of grading roller which is particularly adapted for grading potatoes or other produce of elongated shape. The grading roller shown in this figure is provided with a spiral groove 136 through which the potatoes or like produce will be passed lengthwise, the side walls of the groove tending to move the potatoes or other produce into a flat position in the event of their assuming an upright position and said side walls also act to twist the potatoes so that they will lie flat upon the feeding belt or carrier with their length transverse, to the end that they be delivered through the groove in this position.

It is apparent that under the principle involved, the machine may be modified in various ways without departing from our invention or sacrificing any of the advantages thereof.

Having thus described our invention, what we claim is:—

1. An assorting machine of the kind described, comprising a carrier traveling in one direction, a plurality of grading passages of different sizes through which different sizes of fruit or other produce may be delivered laterally from said carrier, and receiving tables beneath said passages inclined laterally to direct the fruit to one side of the machine, each of said receiving tables having at least a portion of its surface formed of a removable frame and textile material fastened at its marginal portions to said frame.

2. An assorting machine of the kind described, comprising a carrier traveling in one direction, a plurality of grading passages of different sizes through which different sizes of fruit or other produce may be delivered laterally from said carrier, and receiving tables beneath said passages inclined laterally to direct the fruit to one side of the machine, each of said receiving tables having a fixed table portion and a removable table portion, the removable table portion being situated beneath said grading passages and comprising an open frame and textile material stretched over said frame and fastened at its marginal portions thereto.

3. An assorting machine of the kind described, comprising an elongated frame, an endless carrier arranged to travel lengthwise along said frame, a shaft journaled for rotation at each side of said frame, a series of grading frames secured to each of said shafts so as to swing thereon, a grading roller at the inner end of each of said grading frames parallel with said carrier and spaced therefrom, means for rotating the grading rollers of each series of grading frames from each of said shafts, adjusting bolts passing through said grading frames and bearing with their ends against said elongated frame whereby the grading frames may be swung on said shafts to position the grading rollers of said frames the desired distance from said carrier, means for retaining each of said grading frames in adjusted position, and receiving means beneath the grading rollers of said two series of grading frames.

4. In an assorting machine of the kind described, the combination with a frame having assorting mechanism at an elevated point, of an elevating leg secured to said frame and extending downwardly therefrom, and guard members secured to the upper end of said elevating leg and directed downwardly toward a portion of said assorting mechanism.

5. In an assorting machine of the kind described, the combination with a frame having assorting mechanism at an elevated point, of an elevating leg secured to said frame and extending therefrom, said elevating leg having guard members at its upper or inner end extending downwardly therefrom toward a portion of said assorting mechanism.

6. In an assorting machine of the kind described, the combination with a frame having assorting mechanism at an elevated part thereof, of a feeding apparatus pivotally connected to one end of said frame so that it may be swung into horizontal position or at various angles to the horizontal with the inner end thereof in a higher plane than the outer.

7. In an assorting machine of the kind described, the combination with a frame, a pair of spaced rollers rotatable on said frame, an endless traveling belt arranged to travel around said rollers, a plurality of assorting devices independently adjustable with reference to said endless traveling belt, each assorting device having a grading roller, a drive shaft, means for rotating the grading rollers of said assorting devices from said drive shaft, and means for rotating one of the rollers of said endless belt from said drive shaft, of a feeding device connected to said frame, and means for operating said feeding device from the shaft of said last-mentioned roller.

8. In an assorting device of the kind described, the combination with a frame, of a supporting board arranged lengthwise on said frame, an endless traveling carrier having its upper stretch resting upon said supporting board, a series of assorting devices at each side of said carrier, and a pair of flexible members secured to said frame and hanging downwardly in folded form above said carrier with their folded portions in contact with said carrier, said flexible members being positioned between the two series of assorting devices.

9. The combination with a frame having an endless carrier mounted thereon and adapted to travel in one direction, a series of grading elements at each side of said frame in operative relation to said endless carrier, a super-frame extending upwardly above said carrier and said grading elements, and a pair of elongated flexible members having opposite marginal portions secured to said super-frame at high points and sagging between their marginal portions to cause fruit or other produce to be forced thereby against said grading elements.

10. The combination with a frame having an endless carrier mounted thereon and adapted to travel in one direction, a series of grading elements at each side of said frame in operative relation to said endless carrier, a super-frame extending upwardly above said carrier and said grading elements, a pair of elongated flexible members having opposite marginal portions secured to said super-frame at high points and sagging between their marginal portions to cause fruit or other produce to be forced thereby against said grading elements, and means at the feeding ends of said flexible members to direct the fruit or other produce to the spaces between each flexible member and the adjacent grading elements.

11. The combination of a frame having an endless carrier mounted thereon and adapted to travel in one direction, a series of grading elements at each side of said frame in operative relation to said endless carrier, a super-frame extending upwardly above said carrier and said grading elements, a pair of elongated flexible members having opposite marginal portions secured to said super-frame at high points and sagging between their marginal portions to cause fruit or other produce to be forced thereby against said grading elements, and means at the feeding ends of said elongated flexible members to cause fruit or other produce to be directed to either one or both series of grading elements.

12. The combination of a frame having an endless carrier mounted thereon and adapted to travel in one direction, a series of grading elements at each side of said frame in operative relation to said endless carrier, a super-frame extending upwardly above said carrier and said grading elements, a pair of elongated flexible members having opposite marginal portions secured to said super-frame at high points and sagging between their marginal portions to cause fruit or other produce to be forced thereby against the grading elements, and means at the feeding end of said flexible members for directing the fruit or other produce toward opposite series of grading elements, said means comprising a flexible member arranged in V-shape and having opposite ends secured to the adjacent ends of said flexible members.

13. An assorting machine of the kind described, comprising a frame, an elongated traveling element having a forwarding surface, a series of grading elements at each side of the machine having grading rollers spaced from said traveling element, a super-frame extending upwardly above said traveling element and having three spaced longitudinally-disposed members, a flexible element between each outer longitudinal member and the intermediate member of said super-frame and being arranged in folded form with its marginal portions secured to said longitudinal members the folds of said flexible member being in contact with said traveling element, a flexible strip formed into V-shape with its opposite ends connected to the outer fold of each of said flexible members, and a hinged gate extending forwardly from the apex of said V-shaped flexible element and adapted to be positioned centrally over said traveling element or inclined laterally to either side thereof for directing fruit or other produce to one or the other side of the machine, or to both sides thereof.

14. In an assorting machine of the kind described, a traveling element having a forwarding surface inclined laterally in opposite directions, and means for adjusting the inclinations of said traveling element.

15. In an assorting machine of the kind described, a traveling element having a forwarding surface and being inclined laterally in opposite directions from its longitudinal center, and means for increasing or diminishing the lateral opposing inclinations of said forwarding surface.

16. An assorting machine of the kind described, comprising a frame, a pair of parallel supporting boards being pivotally connected at their outer edges to said frame, a traveling carrier supported by said supporting boards, and adjusting means common to both boards for adjusting the same to incline them in opposite directions.

17. An assorting machine of the kind described, comprising a frame, a pair of parallel supporting boards pivotally connected to said frame at their outer edges, adjusting means mounted in said frame and adapted for engagement with said supporting boards to incline the same in opposite directions, and a traveling carrier movable over said adjusting boards and being inclined thereby in opposite directions from its longitudinal center.

18. An assorting machine of the kind described, comprising a frame, a pair of parallel supporting boards pivotally connected at their outer edges to said frame, adjusting bolts threaded through said frame at different points and having bearing blocks at their upper ends against which the inner marginal portions of said supporting boards bear, said supporting boards being inclined oppositely to any desired degree by adjustment of said adjusting bolts, and an endless traveling element supported by said supporting boards and inclined thereby in opposite directions from its longitudinal center.

19. An assorting machine of the kind described, comprising a frame, a supporting board pivotally secured to said frame at one of its edges, means carried by said frame for inclining said supporting board to the desired degree, and an endless traveling element passing over said supporting board in contact therewith.

20. An assorting machine of the kind described, comprising a frame, a supporting board pivotally secured to said frame along one edge thereof, adjusting means passing through said frame at different points and extending upwardly in contact with the under side of said supporting board and serving to incline said board laterally to any desired degree, and a traveling element in contact with the upper side of said board.

21. In an assorting machine of the kind described, the combination of a supporting board having a longitudinal depression formed therein, and a flexible carrier member traveling in contact with said supporting board and somewhat wider than the depression thereof to extend beyond both sides of said depression.

22. In an assorting machine of the kind described, the combination of a flexible traveling element having a forwarding surface, assorting mechanism in coöperating relation to said forwarding surface, and a supporting member on which said flexible member travels and whose upper surface is provided with two spaced bearing portions to permit said flexible member to be depressed between said bearing portions in a plane substantially that in which the fruit to be graded travels.

23. In an assorting machine of the kind described, the combination of a flexible traveling carrier, assorting mechanism associated with said carrier, and a supporting member formed to provide a cushioned portion for said traveling carrier over which the fruit to be graded passes.

24. In an assorting machine of the kind described, the combination of a flexible longitudinally movable carrier, a series of grading rollers in operative relation to said carrier, and means to prevent pinching of the fruit or other produce when traveling along said grading rollers or underneath the same.

25. An assorting machine of the kind described, comprising a cushioned traveling carrier, and assorting mechanism associated with said carrier so as to position the fruit to be sorted directly over the cushioned portion of said traveling carrier.

26. In an assorting machine of the kind described, the combination of a traveling carrier having a forwarding surface, assorting mechanism associated with said carrier, and means for preventing pinching of the fruit or other produce being assorted and to cause the fruit when pinched to be automatically thrown out of pinching position.

27. In an assorting machine of the kind described, the combination of a longitudinally traveling element having a forwarding surface, and a grading roller associated therewith having a spiral groove extending from one end thereof to the other, the bottom or inner wall of said groove serving as the grading or sizing medium.

28. In an assorting machine of the kind described, the combination of a longitudinally traveling carrier having a forwarding surface, and a plurality of grading rollers associated with said forwarding surface, each of said grading rollers being grooved spirally, the bottom or inner wall of the spiral groove serving as the grading or sizing medium.

29. An assorting machine of the kind described, comprising a traveling element having a forwarding surface, a pair of grading rollers associated with said forwarding surface, and receiving means beneath said pair of grading rollers, said receiving means comprising a table, side walls, a pair of gates at one end thereof, a divisional wall between said side walls pivoted at one end to said table to direct fruit or other produce graded by said machine to both of said gates, said divisional wall being arranged to swing laterally in either direction to direct fruit graded by said grading rollers to either of said gates.

30. An assorting machine of the kind described, comprising a traveling carrier having a forwarding surface, a plurality of grading rollers arranged at one side of said traveling carrier, an elongated flexible member secured at one of its marginal portions in a plane above said grading rollers and hanging loosely therefrom with the end thereof at the feeding end of the machine arranged to direct the fruit or other produce fed into the machine laterally toward said grading rollers.

31. In an assorting machine of the kind described, the combination of a support, a supporting board adjustably mounted on said board so as to incline the same to any desired degree, and a traveling carrier having a forwarding surface adapted to move along said supporting board.

In testimony whereof we affix our signatures.

BERT L. GIFFORD.
EDGAR B. GIFFORD.